J. R. RICKETTS.
TROLLEY CATCHER.
APPLICATION FILED SEPT. 15, 1909.
974,920.
Patented Nov. 8, 1910.
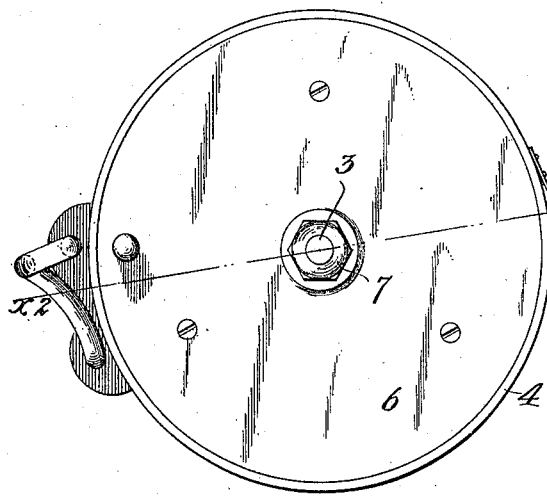
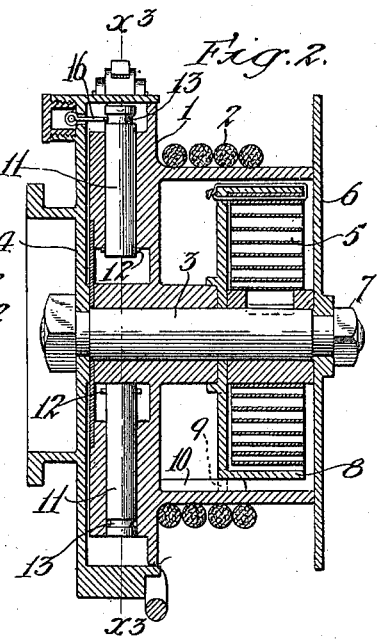
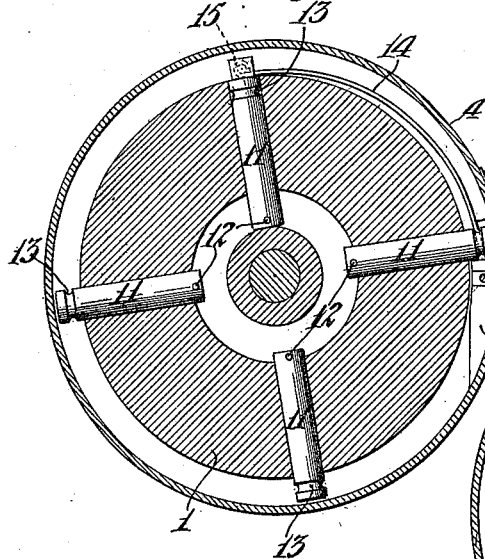
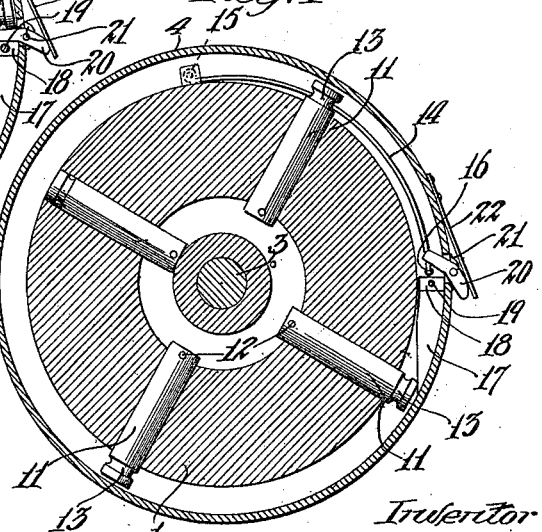
Witnesses:
Louis W. Gratz.
Geo. J. Huting.
Inventor
James R. Ricketts
by Townsend & Hackley
attys.

UNITED STATES PATENT OFFICE.

JAMES R. RICKETTS, OF LONGBEACH, CALIFORNIA, ASSIGNOR TO LOS ANGELES TROLLEY CATCHER COMPANY, OF LOS ANGELES, CALIFORNIA.

TROLLEY-CATCHER.

974,920.

Specification of Letters Patent. Patented Nov. 8, 1910.

Application filed September 15, 1909. Serial No. 517,921.

*To all whom it may concern:*

Be it known that I, JAMES R. RICKETTS, a citizen of the United States, residing at Longbeach, in the county of Los Angeles and State of California, have invented a new and useful Trolley-Catcher, of which the following is a specification.

This invention relates to trolley catchers, and the object of the invention is to provide a simple and inexpensive device which may be readily attached to or detached from a trolley car, to which device the trolley rope may be connected, the device being designed to automatically arrest the trolley from upward movement when it jumps from the wire, and acting automatically to take up the slack in the rope or pay out the rope as the trolley gradually moves up or down owing to the varying height of the trolley wire as the car moves along. But when the trolley jumps from the wire the device acts to automatically hold the trolley rope against outward movement so that the trolley is held from upward movement when off the wire, which prevents the trolley from rising but a short distance so that when the first span wire is struck the pole glances under the span wire and is thereby thrown down and the trolley rope automatically reeled in and the pole is caught again in this lower position and prevented from rising high enough to strike the span wires which follow the first span wire. Thus the pole strikes only the first span wire and strikes that at an easy angle which prevents damage.

In carrying out my invention, I employ a spring operated reel, upon which the trolley rope is wound, and a locking mechanism operating by gravity to prevent rotation of the reel whenever it is given a sudden rotation by the trolley jumping from the wire. I accomplish this automatic locking by means of a plurality of dogs arranged to slide by gravity radially, or substantially radially, of the reel, any one of which dogs is adapted to strike against an abutment when the reel operates at a speed so fast that the dog does not have time to drop, and to thereby positively lock the reel against further rotation, and the most important object of the present invention is to provide for holding said dog in locking position during the period immediately after catching the trolley, during which period the suddenly arrested trolley vibrates up and down imparting a succession of jerks to the rope which would result in releasing the dog were it not that some means were employed for preventing it. The particular means for which I employ in the present invention for this purpose consists of a curved track arranged eccentrically to the axis of rotation of a dog and each dog being so constructed as to engage a curved track when the dog is prevented from dropping by the swiftly running reel at the time the trolley jumps from the wire, the curved track acting to positively guide the dog engaged thereby into engagement with the locking abutment, and the track serves to hold the dog in extended position, even should the reel take a reverse movement, as during the vibratory action referred to, which occurs upon the sudden arresting of the trolley.

Another object of the present invention is to cushion the engagement of the locking dog with the abutment.

Referring to the drawings:—Figure 1 is a front elevation of the device. Fig. 2 is a cross section on line $x^2$—$x^2$ Fig. 1. Fig. 3 is a section on line $x^3$—$x^3$ Fig. 2, showing the parts in position with a dog having contacted with the abutment and arrested the trolley. Fig. 4 is a view similar to Fig. 3, showing the parts just previous to the engagement of the dog with the abutment.

1 designates a reel on which is wound the trolley rope 2, the reel being mounted to rotate on a shaft 3, which is supported in a casing 4. A spring 5 is secured at one end to a cylindrical cage 8 and at the other end to a shaft 3, placing the reel under a constant tension tending to rotate the reel and wind up the rope 2. A disk 6 is secured at one end of the reel by a nut 7 and acts as a flange to retain the rope 2 and to also house the spring 5. The spring 5 is retained in a cylindrical cage 8 which is caused to revolve with the reel 1 by a notched lug 9 which engages a rib 10 on the inside of the reel.

The reel 1 is provided with four radially slidable bolts or dogs 11, each dog 11 having a pin 12 at its inner end to prevent it from moving too far outwardly, and its outer end having a groove 13 which is adapted to engage with a curved track formed of a wire 14 curved eccentrically to the shaft 3 and extending approximately through a quarter of a circle, one end of the wire 15 being located at the upper side of the device, and the other end of the wire 16 being located near the side of the device.

17 is a lug cast integrally with the case 4, and its end is protected by a steel cap 18 which is secured in position by a screw 19. A lever 20 is pivoted to a lug 21 on the outside of the case and extends through a slot in the case, and its inner end lies immediately above the cap 18 and in position to be struck by a dog 11. A flat spring 22, secured to the outside of the case, bears against the exposed end of the lever 20 and serves to normally hold the lever tilted, as shown in Fig. 4.

During the normal operation of the trolley, the rotation of the reel is so slow that the dogs 11, as they approach the top, drop by gravity, but when the reel takes a faster movement, caused by the trolley jumping from the wire, one of the dogs, as it nears the top, will be moved bodily so fast that it does not have time to drop radially by gravity and its groove 13 will ride onto the curved wire 14 and the dog will be carried around by the reel and strike against the inner end of the lever 20, thereby depressing the lever 20 until it strikes the cap 18, whereupon further movement of the reel is arrested, and the rope 2 being prevented from further outward movement catches the trolley pole. The action of the interposed lever 20, resisted by the spring 22, serves to cushion the strike of the dog 11, and thus injury to the parts is avoided. The steel cap 18 is provided for the purpose of preventing the casting 17 from chipping off or breaking off as it would be apt to do under the sudden impact received from the dog 11. This impact, however, is lessened by the interposition of the cushion lever 20.

It will be observed that when the trolley has thus been caught, that during the succeeding vibratory action, during which time the reel vibrates back and forth a short distance, the dog 11 is positively held in extended position by its engagement with the wire 14, so that during such time it is impossible for the dog 11 to move inwardly far enough to escape the lever 20 or locking cap 18. Thus a very important advantage is attained, as the trolley, after once being caught, is securely held until it has been restored to the wire by the conductor.

What I claim is:—

1. A reel, a plurality of dogs slidable substantially radially of the reel, each dog adapted to drop by gravity as it passes through the upper portion of its orbital cycle, a stationary abutment adapted to be engaged by said dog when the reel moves faster than the dog can drop by gravity, and means for preventing retraction of a dog after it has engaged an abutment.

2. A reel, a plurality of dogs slidably mounted radially therein, a stationary abutment adapted to be engaged by any of said dogs when the reel moves faster than the dogs can drop by gravity, a track extending toward said abutment, said dogs being adapted to engage said track and being retained thereby in extended position when the reel moves faster than the dogs can drop by gravity.

3. A reel, a plurality of dogs slidable substantially radial thereof, a stationary abutment adapted to be engaged by any of said dogs when the reel moves faster than a dog can drop by gravity, an eccentrically curved wire leading toward said abutment, each of said dogs having a groove near its outer end which is adapted to engage with said wire when a dog does not drop by gravity quickly enough to escape the wire.

4. A reel, a plurality of dogs slidable substantially radial thereof, a stationary abutment adapted to be engaged by any of said dogs when the reel moves faster than a dog can drop by gravity, an eccentrically curved wire leading toward said abutment, each of said dogs having a groove near its outer end which is adapted to engage with said wire when a dog does not drop by gravity quickly enough to escape the wire, and cushioning means in front of said abutment adapted to be struck by a dog.

5. A reel, a plurality of dogs slidable substantially radial thereof, a stationary abutment adapted to be engaged by any of said dogs when the reel moves faster than a dog can drop by gravity, an eccentrically curved wire leading toward said abutment, each of said dogs having a groove near its outer end which is adapted to engage with said wire when a dog does not drop by gravity quickly enough to escape the wire, cushioning means in front of said abutment adapted to be struck by a dog, and a steel cap over said abutment preventing the same from chipping off.

6. A reel, a stationary abutment, a plurality of dogs slidable on said reel and adapted to be arrested by said abutment when the reel moves faster than the dog can drop by gravity, a lever pivoted in front of said abutment, the end of said lever projecting through the casing, and a spring bearing against the exposed end of said lever.

7. In combination, a reel for trolley ropes adapted to have the trolley rope wound thereon, a shaft journaled in said reel, a casing inclosing a portion of said reel, a stop on said casing, a pivoted arm mounted on said casing, a spring for holding said arm out of engagement with said stop, and radial bolts slidable in said reel and adapted to engage said arm when moved outwardly by gravity.

8. In combination, a reel for trolley ropes adapted to have the trolley rope wound thereon, a shaft journaled in said reel, a casing inclosing a portion of said reel, a stop on said casing, a series of radial bolts slidable in said reel and having a groove near their outer end, and a curved track on said casing, eccentric to said reel, for engaging said grooves when the bolts have been moved outwardly by gravity and positively holding said bolts in position to engage said stop.

In testimony whereof, I have hereunto set my hand at Los Angeles, California, this 7th day of September 1909.

JAMES R. RICKETTS.

In presence of—
G. T. HACKLEY,
FRANK L. A. GRAHAM.